(12) United States Patent
Yun et al.

(10) Patent No.: US 8,370,130 B2
(45) Date of Patent: Feb. 5, 2013

(54) SPEECH UNDERSTANDING SYSTEM USING AN EXAMPLE-BASED SEMANTIC REPRESENTATION PATTERN

(75) Inventors: Seung Yun, Daejeon (KR); Seung Hi Kim, Daejeon (KR); Jun Park, Daejeon (KR); Jeong Se Kim, Daejeon (KR); Ilbin Lee, Daejeon (KR); Soo Jong Lee, Daejeon (KR); Sanghun Kim, Daejeon (KR); Sang Kyu Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 588 days.

(21) Appl. No.: 12/622,060

(22) Filed: Nov. 19, 2009

(65) Prior Publication Data

US 2011/0054883 A1 Mar. 3, 2011

(30) Foreign Application Priority Data

Sep. 1, 2009 (KR) .................. 10-2009-0081936

(51) Int. Cl.
*G06F 17/27* (2006.01)
(52) U.S. Cl. .................. 704/9; 704/10; 704/4
(58) Field of Classification Search .......... 704/1–10, 704/251, 255, 257, 270, 270.1, 231, 235
See application file for complete search history.

(56) References Cited

U.S. PATENT DOCUMENTS

| | | | |
|---|---|---|---|
| 7,050,977 B1 * | 5/2006 | Bennett | 704/270.1 |
| 7,225,128 B2 | 5/2007 | Kim et al. | |
| 8,155,951 B2 * | 4/2012 | Jamieson | 704/10 |
| 2007/0208556 A1 | 9/2007 | Kwak et al. | |

FOREIGN PATENT DOCUMENTS

| | | |
|---|---|---|
| KR | 10-2007-0090642 | 9/2007 |
| KR | 10-2007-0102267 | 10/2007 |
| KR | 10-2009-0000442 | 1/2009 |

* cited by examiner

*Primary Examiner* — Huyen X. Vo
(74) *Attorney, Agent, or Firm* — Blakely, Sokoloff, Taylor & Zafman

(57) ABSTRACT

A speech understanding apparatus includes: a speech recognition unit for recognizing an input speech to produce a speech recognition result; a sentence analysis unit for performing morpheme analysis on a sentence corresponding to the speech recognition result, extracting additional information, and performing syntax analysis; a hierarchy describing unit for describing hierarchy of the sentence; a class transformation unit for performing class transformation on the sentence; a semantic representation determination unit for marking optional expressions for the sentence, deleting meaningless expressions and the additional information, converting the sentence into its base form, and deleting morphemic tags or symbols to determine a semantic representation; a semantic representation retrieval unit for retrieving the determined semantic representation from an example-based semantic representation pattern database; and a retrieval result processing unit for selectively producing a retrieved semantic representation.

17 Claims, 6 Drawing Sheets

SPEECH UNDERSTANDING SYSTEM USING AN EXAMPLE-BASED SEMANTIC REPRESENTATION PATTERN

CROSS-REFERENCE(S) TO RELATED APPLICATION(S)

The present invention claims priority of Korean Patent Application No. 10-2009-0081936, filed on Sep. 1, 2009, which is incorporated herein by reference.

FIELD OF THE INVENTION

The present invention relates to a technique for producing a speech recognition result by using an example-based semantic representation pattern, and, more particularly, to a speech understanding system using an example-based semantic representation pattern, which is appropriate to produce a speech recognition result reflecting a user's intention for an input speech by constructing an example-based semantic representation pattern database.

BACKGROUND OF THE INVENTION

As well-known in the art, speech recognition application systems can be generally classified into an application system employing an isolated word speech recognizer and an application system employing a connected speech recognizer.

Of the speech recognition application systems, the application system employing an isolated word speech recognizer mostly has a simple command-oriented, small speech recognizer applied thereto. Therefore, its application is limited and speech recognition errors appear in a relatively simple form, so there is generally no difficulty in handling these errors.

However, the application system employing a connected speech recognizer is used in various applications and the range of recognition targets is very wide, which often leads to dissatisfaction in the performance of the system. This is basically due to limitations in speech recognition technology.

Especially, a language modeling technology applied to connected speech recognition can be divided into a rule-based language model, such as a finite state network (FSN) or a context-free grammar (CFG), and an N-Gram-based language model. The rule-based language model has a disadvantage in that it is applicable only to a relatively limited number of fields because it is difficult to model various utterances of a user in detail, while the N-Gram-based language model has a wider application range because it is capable of modeling various utterances of a user.

However, although a speech recognition result that is similar to an utterance intended by the user can be generally produced if the scale of corpus used for training is enough and the corpus is optimized for a domain, it is almost impossible to actually construct such an optimized corpus for each application field. Thus, it is common knowledge, in reality, that a result of speech recognition employing the N-Gram language model is imperfect.

If any error resulting from this problem occurs, the speech recognition application system may have great difficulty in handling the error. For instance, if even a single word is different, an automatic interpretation system, which is a kind of application system, may produce a translation result which is quite different from the user's intention. In the case of a speech dialogue system, which is another kind of application system, if a dialog manager accepts this error as it is, a handling error may occur or the handling itself may be impossible.

In the event of this error, in order to solve this problem, the user has to keep uttering until a correct recognition result is produced. This leads to a significant decrease in user satisfaction. Even worse, if no advance preparation has been made for a certain speech even though a correct recognition result thereof is produced, an error may occur in the processing of the system and therefore preparations for these situations are required. At present, however, there exists no countermeasure technology that can solve this problem.

As described above, what is important for a speech recognition application system is to produce a corrected speech recognition result reflecting a user's intention, rather than to recognize a user's speech as it is. Further, the development of a technique for producing a speech recognition result reflecting a user's intention is desperately needed.

SUMMARY OF THE INVENTION

In view of the above, the present invention provides a speech understanding system, which can produce a semantic representation reflecting a user's intention by using an example-based semantic representation pattern and additional information that are pre-constructed for a corpus corresponding to an input speech.

Further, the present invention provides a speech understanding system, which can produce a corrected speech recognition result for easy processing by using an example-based semantic representation pattern.

In accordance with a first aspect of the present invention, there is provided a pattern database building apparatus, including:

a sentence analysis unit for segmenting an input corpus into example sentences with reference to a phrase dictionary and performing morpheme analysis and syntax analysis on the segmented example sentences;

a hierarchy describing unit for describing hierarchy of the example sentences based on results of the morpheme analysis and the syntax analysis;

a class transformation unit for performing class transformation on the example sentences, whose hierarchy has been described, with reference to a thesaurus/ontology and a classification rule dictionary; and a semantic representation pattern determination unit for marking optional expressions for the example sentences that have been undergone the class transformation, deleting meaningless expressions and additional information, converting the example sentences into their base form, deleting morphemic tags or symbols to determine a semantic representation pattern of the example sentences, and storing the determined semantic representation pattern in a database.

In accordance with a second aspect of the present invention, there is provided a speech understanding apparatus, including:

a speech recognition unit for recognizing an input speech to produce a speech recognition result;

a sentence analysis unit for performing morpheme analysis on a sentence corresponding to the speech recognition result, recognizing and extracting additional information, and performing syntax analysis;

a hierarchy describing unit for describing hierarchy of the sentence based on the additional information and results of the morpheme analysis and the syntax analysis;

a class transformation unit for performing class transformation on the sentence, whose hierarchy has been described, with reference to a thesaurus/ontology and a classification rule dictionary;

a semantic representation determination unit for marking optional expressions for the sentence that has been undergone the class transformation, deleting meaningless expressions and the additional information, converting the sentence into its base form, and deleting morphemic tags or symbols to determine a semantic representation;

a semantic representation retrieval unit for retrieving the determined semantic representation from an example-based semantic representation pattern database; and a retrieval result processing unit for selectively producing a retrieved semantic representation depending on whether or not the determined semantic representation exists in the example-based semantic representation pattern database.

In accordance with a third aspect of the present invention, there is provided a speech understanding method including:

recognizing an input speech to produce a speech recognition result;

performing morpheme analysis on a sentence corresponding to the speech recognition result, recognizing and extracting additional information, and performing syntax analysis;

describing the hierarchy of the sentence based on the additional information and results of the morpheme analysis and the syntax analysis;

performing class transformation on the sentence whose hierarchy has been described;

marking optional expressions for the sentence that has been undergone the class transformation, deleting meaningless expressions and the additional information, converting the sentence into its base form, deleting morphemic tags or symbols to determine a semantic representation;

retrieving the determined semantic representation from an example-based semantic representation pattern database; and selectively producing a retrieved semantic representation depending on whether or not the determined semantic representation exists in the example-based semantic representation pattern database.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
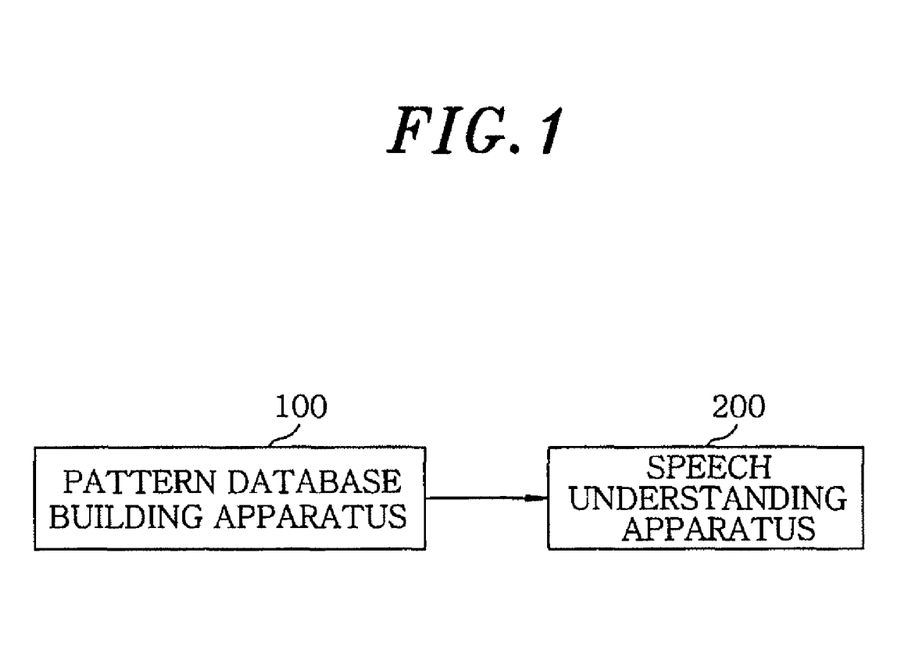
FIG. 1 is a block diagram of a speech understanding system using an example-based semantic representation pattern in accordance with an embodiment of the present invention.

FIG. 1 is a block diagram of a speech understanding system using an example-based semantic representation pattern in accordance with an embodiment of the present invention. The speech understanding system includes a pattern database building apparatus 100, and a speech understanding apparatus 200. The pattern database building apparatus 100 is for making a database for example-based semantic representation patterns for a corpus. The speech understanding apparatus 200 is for determining a semantic representation of an input speech and then selectively producing a speech recognition result with reference to the example-based semantic representation pattern database.

Figure 2:
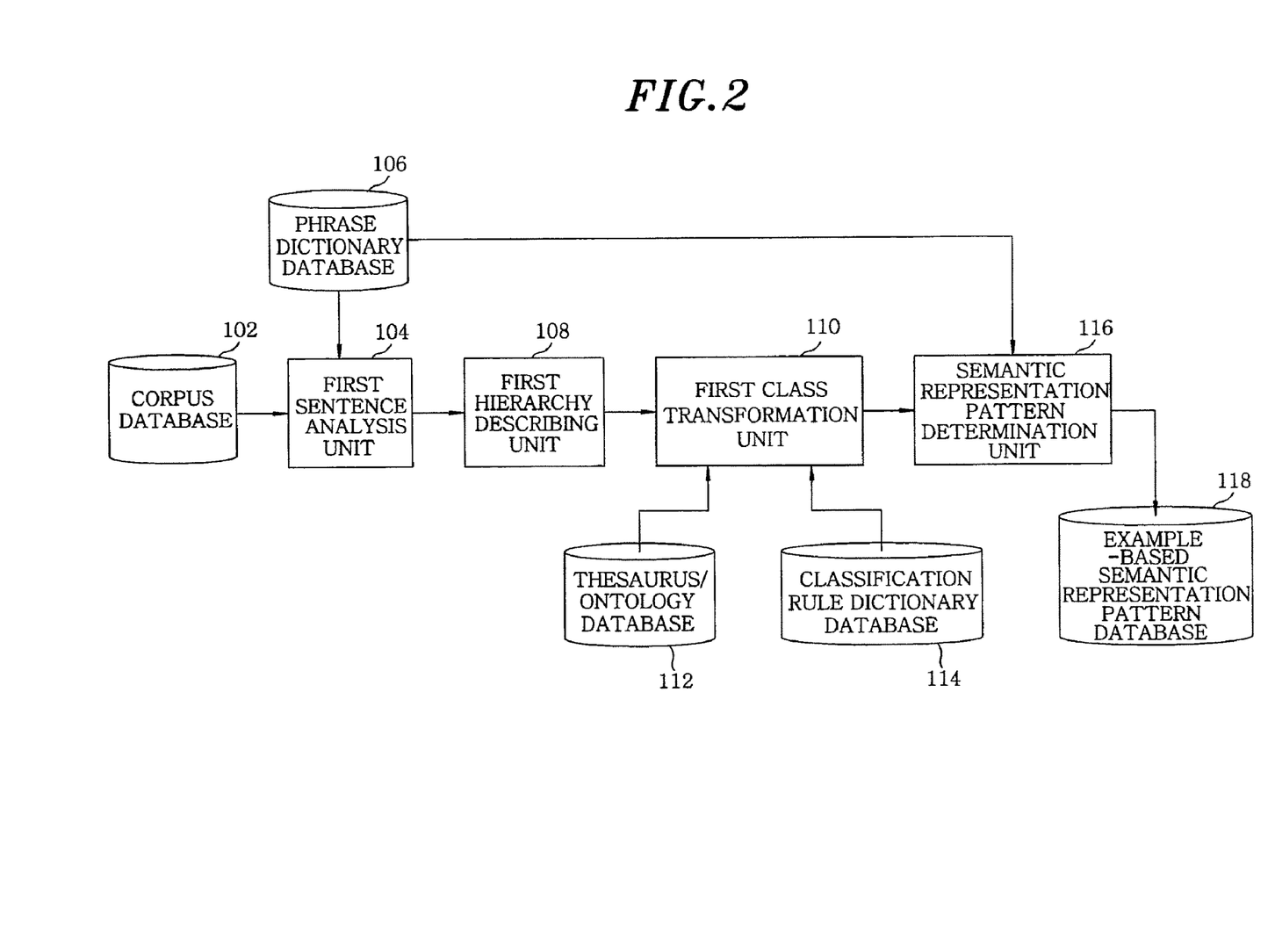
FIG. 2 illustrates a block diagram of a pattern database building apparatus shown in FIG. 1.

Hereinafter, the pattern database building apparatus 100 and a speech understanding apparatus 200 will be described in detail with reference to FIGS. 2 and 3, respectively. FIG. 2 is a block diagram of the pattern database building apparatus 100 shown in FIG. 1. The pattern database building apparatus 100 includes a corpus database 102, a first sentence analysis unit 104, a phrase dictionary database 106, a first hierarchy describing unit 108, a first class transformation unit 110, a thesaurus/ontology database 112, a classification rule dictionary database 114, a semantic representation pattern determination unit 116, and an example-based semantic representation pattern database 118.

As shown in FIG. 2, the corpus database 102 stores corpora corresponding to various utterances. If the corpus database 102 contains many corpora reflecting users' intention though it does not contain all corpora corresponding to the various utterances of users, the corpora are more helpful in determining an example-based semantic representation pattern based on a user's intention.

The first sentence analysis unit 104 performs sentence segmentation, morpheme analysis, and syntax analysis on a corpus. When a corpus is extracted from the corpus database 102, in order to process the corpus in sentence units, the extracted corpus is segmented into individual example sentences. However, idiomatic phrases like "예 (Yes)", "안녕하세요 (How are you)", and "감사합니다 (Thank you)", included in one corpus may be included in one example sentence, rather than being separated into individual example sentences.

Further, the first sentence analysis unit 104 performs morpheme analysis on each of the segmented example sentences with reference to the phrase dictionary database 106, and performs syntax analysis on each example sentence based on the morpheme analysis result. Here, the morpheme analysis result may include morphemic tags or symbols. In the case of syntax analysis, dependencies may be indicated by text-indent or the like, for example, depending on the dependency grammar or the like.

Next, the first hierarchy describing unit 108 describes the hierarchy of each example sentence, for example, by bracketing based on a syntax analysis result. In case of a Korean word "이다" it can be connected to the preceding word, and the arrangement of words in the same hierarchy can be changed.

The first class transformation unit 110 performs class transformation on the example sentences, whose hierarchy has been described, with reference to the thesaurus/ontology database 112 and the classification rule dictionary database 114. This class transformation is performed to increase coverage. For instance, a noun is converted into a hypernym class, synonyms from declinable words are converted into a single word, particles subject to phonological change due to a final consonant are assigned to the same class, and numeric representations of time and amount are classified by using automata so as to recognize various numerical variations.

The semantic representation pattern determination unit 116 marks optional expressions (e.g., expressions that may appear or not) in the example sentences that have been undergone the class transformation, deletes meaningless expressions such as interjections (exclamations), and deletes additional information including aspect, modality, tense, sentence pattern, and the like from declinable words in the example sentences to convert the example sentences into their base form. Here, the additional information may be expressed by an auxiliary declinable word, the ending of a word and the like. This process makes it possible for such information not to be considered when a semantic representation corresponding to a speech recognition result is retrieved. However, a conjunctive ending, a converted ending, and the like are not deleted, so that their meanings are reflected in a semantic representation.

Also, the semantic representation pattern determination unit 116 deletes morphemic tags or symbols of the example sentences to determine an example-based semantic representation pattern. The determined semantic representation pattern is stored in the example-based semantic representation pattern database 118.

In this way, an example-based database of semantic representation patterns for speech understanding may be built by using the pattern database building apparatus 100.

Figure 3:
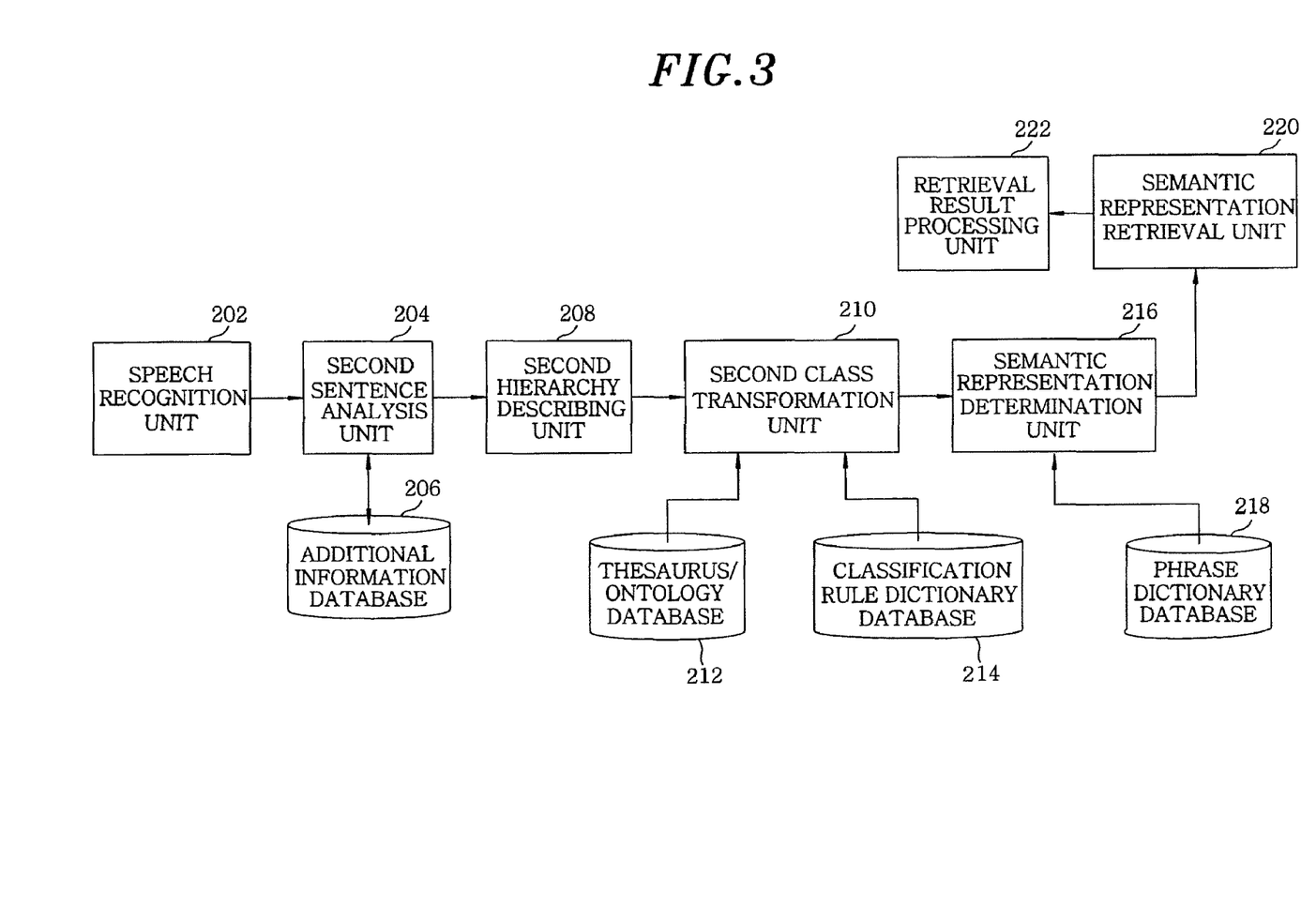
FIG. 3 shows a block diagram of a speech understanding apparatus shown in FIG. 1.

FIG. 3 is a block diagram of the speech understanding apparatus 200 shown in FIG. 1. The speech understanding apparatus 200 includes a speech recognition unit 202, a second sentence analysis unit 204, an additional information database 206, a second hierarchy describing unit 208, a second class transformation unit 210, a thesaurus/ontology database 212, a classification rule dictionary database 214, a semantic representation determination unit 216, a phrase dictionary database 218, a semantic representation retrieval unit 220, and a retrieval result processing unit 222.

Referring to FIG. 3, when a speech is input, the speech recognition unit 202 pre-processes the input speech to extract features for speech recognition from the input speech, and compares the extracted features with an acoustic model of words and with a language model representing a connection probability between words to selectively produce a sentence having the highest probability. The produced sentence may be in form of a word string (1-best), 'n' number of word strings (n-best), or a lattice of words. The sentence, as a speech recognition result, is provided to the second sentence analysis unit 204.

The second sentence analysis unit 204 performs morpheme analysis on the sentence provided as a speech recognition result. Furthermore, the second sentence analysis unit 204 recognizes and extracts additional information on the input sentence. In detail, the second sentence analysis unit 204 first recognizes and extracts the tense of each declinable word based on the morpheme analysis result, and then an aspect such as a progressive aspect and the like. Thereafter, the second sentence analysis unit 204 recognizes and extracts a modality such as an imperative modality and the like, and a sentence pattern, such as an affirmative sentence, a negative sentence, an interrogative sentence and the like. The extracted additional information is stored in the additional information database 206.

Further, the second sentence analysis unit 204 performs syntax analysis on the sentence by using the morpheme analysis result and the additional information. Here, the morpheme analysis result may include morphemic tags or symbols. In the case of syntax analysis, dependencies can be indicated by text-indent or the like, for example, depending on the dependency grammar or the like.

The second hierarchy describing unit 208, the second class transformation unit 210 and the semantic representation determination unit 216 of the speech understanding apparatus 200 are substantially identical to the first hierarchy describing unit 108, the first class transformation unit 110 and the semantic representation pattern determination unit 116 of the pattern database building apparatus 100 shown in FIG. 2, except that the speech understanding apparatus 200 is for the sentence as the speech recognition result while the pattern database building apparatus 100 is for the example sentences segmented from a corpus. Therefore, detailed descriptions for the identical components of the speech understanding apparatus 200 will be omitted for the sake of simplicity of the present invention.

A semantic representation determined by the semantic representation determination unit 216 is delivered to the semantic representation retrieval unit 220, together with the speech recognition result, i.e. input sentence, and the additional information.

The semantic representation retrieval unit 220 retrieves the delivered semantic representation from the example-based semantic representation pattern database 118 of FIG. 2 to provide the retrieval result to the retrieval result processing unit 222.

In this regard, the semantic representation retrieval unit 220 does not merely search for a completely matching semantic representation, but may search for a partially different example-based semantic representation based on a specific criterion. The criterion can be adjusted depending on the performance of the applied speech recognition system to perform an error correction function. In some cases, recognition can be done within a range consistent with the hierarchies dominated by a higher hierarchy (i.e., the highest-hierarchical dominating word) based on the hierarchy described in the semantic representation.

For example, in case where there is no completely matching semantic representation, if the determined semantic representation matches the higher hierarchy even though it does not match the lower hierarchy, only the matching higher hierarchy can be output to reflect the key intention of the sentence. At this point, if the semantic representation has a relatively low degree of matching even with the higher hierarchy, the speech understanding process is finished and only the speech recognition result is provided to the retrieval result processing unit 222. Otherwise, if it has a high degree of matching, the retrieved semantic representation, the speech recognition result, and the additional information may be provided to the retrieval result processing unit 222 for the process of speech understanding.

If the determined semantic representation does not exist in the example-based semantic representation pattern database 118, the retrieval result processing unit 222 only produces the speech recognition result provided from the semantic representation retrieval unit 220. Otherwise, if the determined semantic representation exists in the example-based semantic representation pattern database 118, the retrieval result processing unit 222 checks whether or not the retrieved semantic representation has been set up to be made into a sentence. If the retrieved semantic representation can be made into a sentence, the retrieval result processing unit 222 converts the retrieved semantic representation into a sentence (i.e., a sentence corresponding to the retrieved semantic representation) and then produces the converted sentence. Otherwise, if the retrieved semantic representation cannot be made into a sentence, the retrieval result processing unit 222 produces the speech recognition result, the semantic representation, and the additional information provided from the semantic representation retrieval unit 220.

Therefore, by determining a semantic representation corresponding to a speech recognition result, and selectively producing a retrieved semantic representation depending on the presence or absence of a matching semantic representation in the example-based semantic representation pattern database, it is possible to effectively produce a semantic representation reflecting the user's intention.

Figure 4:
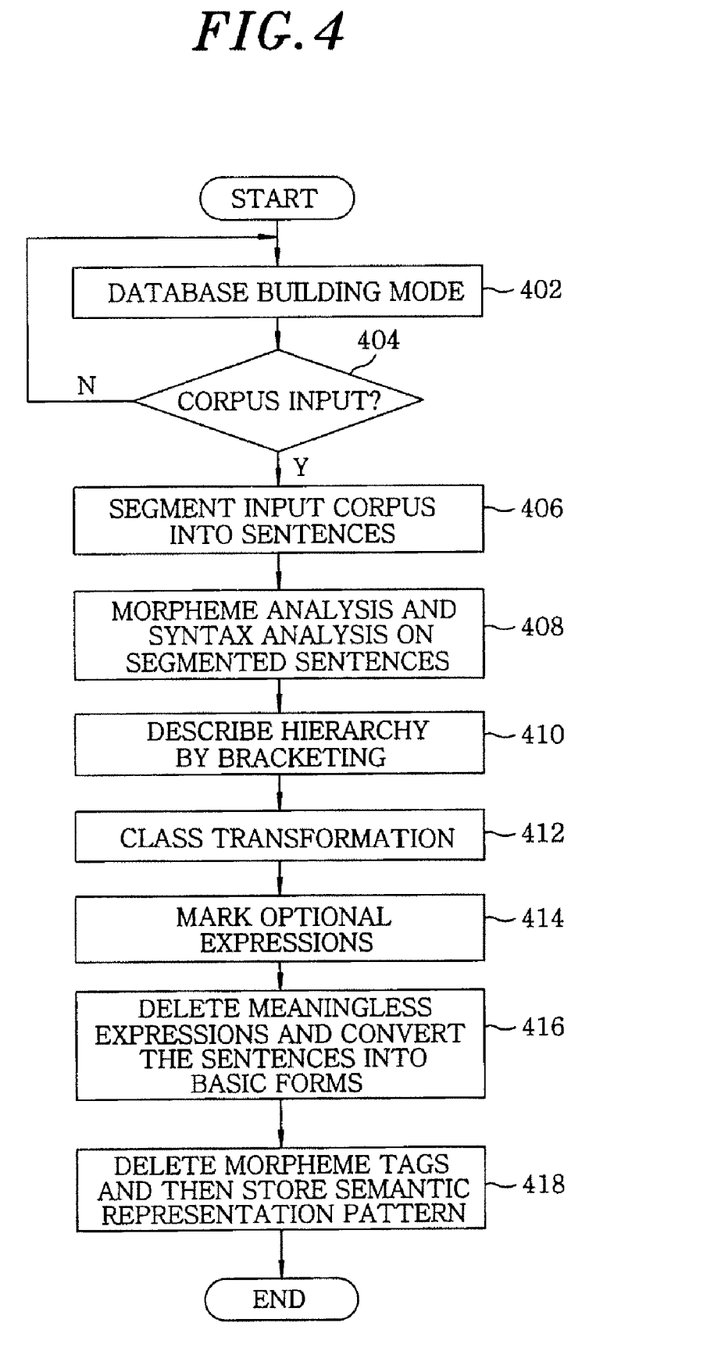
FIG. 4 provides a flowchart showing a process for making a database of example-based semantic representation patterns of a corpus in accordance with the embodiment of the present invention.

FIG. 4 is a flowchart showing a process for making a database of example-based semantic representation patterns of a corpus in accordance with the embodiment of the present invention.

Referring to FIG. 4, in a database building mode of the pattern database building apparatus 100 in step 402, if a corpus is extracted from the corpus database 102 and provided to the first sentence analysis unit 104 in step S404, the first sentence analysis unit 104 segments the extracted corpus into individual example sentences in step 406. However, idiomatic phrases like "예 (Yes)", "안녕하세요 (How are you)", and "감사합니다 (Thank you)", included in one corpus may be processed to be included in one example sentence, rather than being separated into individual example sentences.

Hereinafter, the embodiment of the present invention in FIG. 4 will be described with respect to an example sentence saying "인천 공항에서 가장 가까운 호텔은 어느 곳이죠? (Where is the nearest hotel to Incheon Airport?)".

Further, the first sentence analysis unit 104 performs morpheme analysis on the example sentence with reference to the phrase dictionary database 106, and performs syntax analysis on the example sentence based on the morpheme analysis result in step 408. Here, the morpheme analysis result may include morphemic tags or symbols. In the case of syntax analysis, dependencies can be indicated by text-indent or the like, for example, depending on the dependency grammar or the like.

The example sentence on which the morpheme analysis has been performed can be represented as shown in Table 1:

TABLE 1

| |
|---|
| 인천 [proper noun]　공항 [non-predicate noun] |
| 에서 [adverbial particle]　가장 [degree adverb] |
| 가깝 [attributive adjective] ㄴ [adnominal ending] |
| 호텔 [non-predicate noun] 은 [auxiliary particle] |
| 어느 [demonstrative adnominal] |
| 곳 [non-predicate noun] 이 [predicative particle] |
| 죠 [interrogative final ending] ? [end-stop] |

When the syntax analysis has been performed on the example sentence, the result can be described as shown in Table 2:

TABLE 2

| |
|---|
| 이 [predicative particle] + 죠 [interrogative final ending] |
| 어느 [demonstrative adnominal] 곳 [non-predicate noun] |
| 호텔 [non-predicate noun] + 은 [auxiliary particle] |
| 가깝 [attributive adjective] + ㄴ [adnominal ending] |
| 가장 [degree adverb] |
| 인천 [proper noun]　공항 [non-predicate noun] |
| +에서 [adverbial particle] |

Next, the first hierarchy describing unit 108 describes the hierarchy of the example sentence, for example, by bracketing based on the syntax analysis result in step 410. The example sentence whose hierarchy has been described can be shown as shown in the following Table 3:

TABLE 3

| |
|---|
| ( ( ( (인천 [proper noun]　공항 [non-predicate noun] |
| +에서 [adverbial particle] ) |
| (가장 [degree adverb] )　가깝 [attributive adjective] |
| + ㄴ [adnominal ending] )　호텔 [non-predicate noun] |
| 호텔 [auxiliary particle] )　(어느 [demonstrative adnominal] |
| 곳 [non-predicate noun] ) +이 [predicative particle] |
| +죠 [interrogative final ending] ? [end-stop] ) |

The first class transformation unit 110 performs class transformation on the example sentence, whose hierarchy has been described, with reference to the thesaurus/ontology database 112 and the classification rule dictionary database 114 in step 412. The example sentence on which class transformation has been performed can be represented as shown in the following Table 4:

TABLE 4

| |
|---|
| ( ( ( ($공항+에서 [adverbial particle] )　(가장 [degree adverb] ) |
| $가까운) [$auxiliary particle　-은/는] ) |
| (어느 [demonstrative adnominal]　곳 [non-predicate noun] ) |
| +이 [predicative particle] |
| +죠 [interrogative final ending] ? [end-stop] ) |

Here, it can be found that "인천공항", "가까운", and "은" are classified. Symbols such as $ can be attached to the front of the classified words.

The semantic representation pattern determination unit 116 marks optional expressions (e.g., expressions that may appear or not) for the example sentence that has been undergone class transformation in step 414. For example, '[ ]' is used to indicate the optional expression. The result is represented as shown in Table 5:

TABLE 5

| |
|---|
| ( ( ( ($공항+[에서 [adverbial particle] ] )　( [가장 [degree adverb] ] ) |
| $가까운)$호텔+ [$auxiliary particle -은/는] ) |
| (어느 [demonstrative adnominal]　곳 [non-predicate noun] ) |
| +이 [predicative particle] +죠 [interrogative final |
| ending] ? [end-stop] ) |

Thereafter, in step 416, the semantic representation pattern determination unit 116 deletes meaningless expressions such as interjections (exclamations), and deletes additional information including aspect, modality, tense, sentence pattern, and the like from declinable words in the example sentence to convert the example sentence into its base form. This makes it possible for such information not to be considered when a semantic representation corresponding to a speech recognition result is retrieved. However, a conjunctive ending, a converted ending, and the like are not deleted, so that their meanings are reflected in the semantic representation.

Also, the semantic representation pattern determination unit 116 deletes morphemic tags or symbols of the example sentence to determine an example-based semantic representation pattern, and stores the determined semantic representation pattern in the example-based semantic representation pattern database 118. Such a semantic representation pattern can be represented as shown in Table 6:

TABLE 6

(((($공항+[에서])([가장]) $가까운)$호텔+[$ auxiliary particle -은/는])(어느 곳)+이다)

Through the above described procedures, the semantic representation pattern is completed.

Figure 5A:
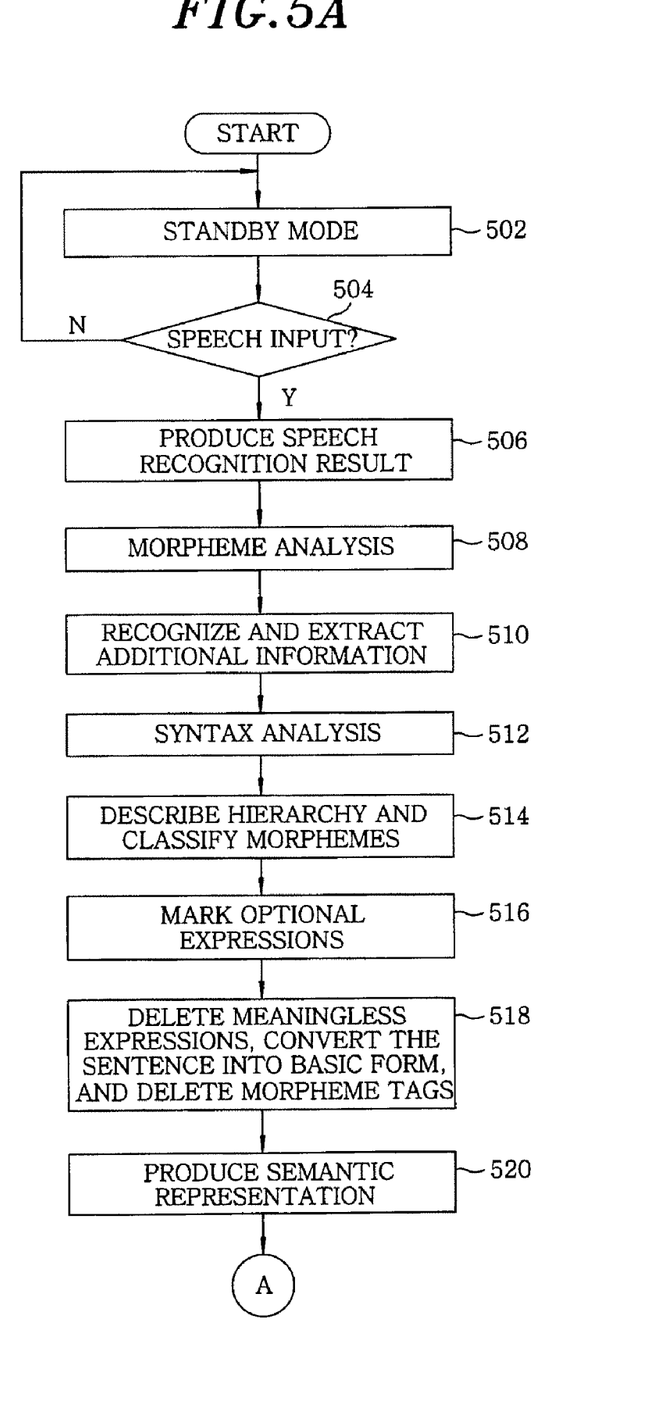
FIGS. 5A and 5B illustrate a flowchart of a process for determining a semantic representation of an input speech and then selectively producing the same with reference to an example-based semantic representation pattern in accordance with the embodiment of the present invention.
Figure 5B:
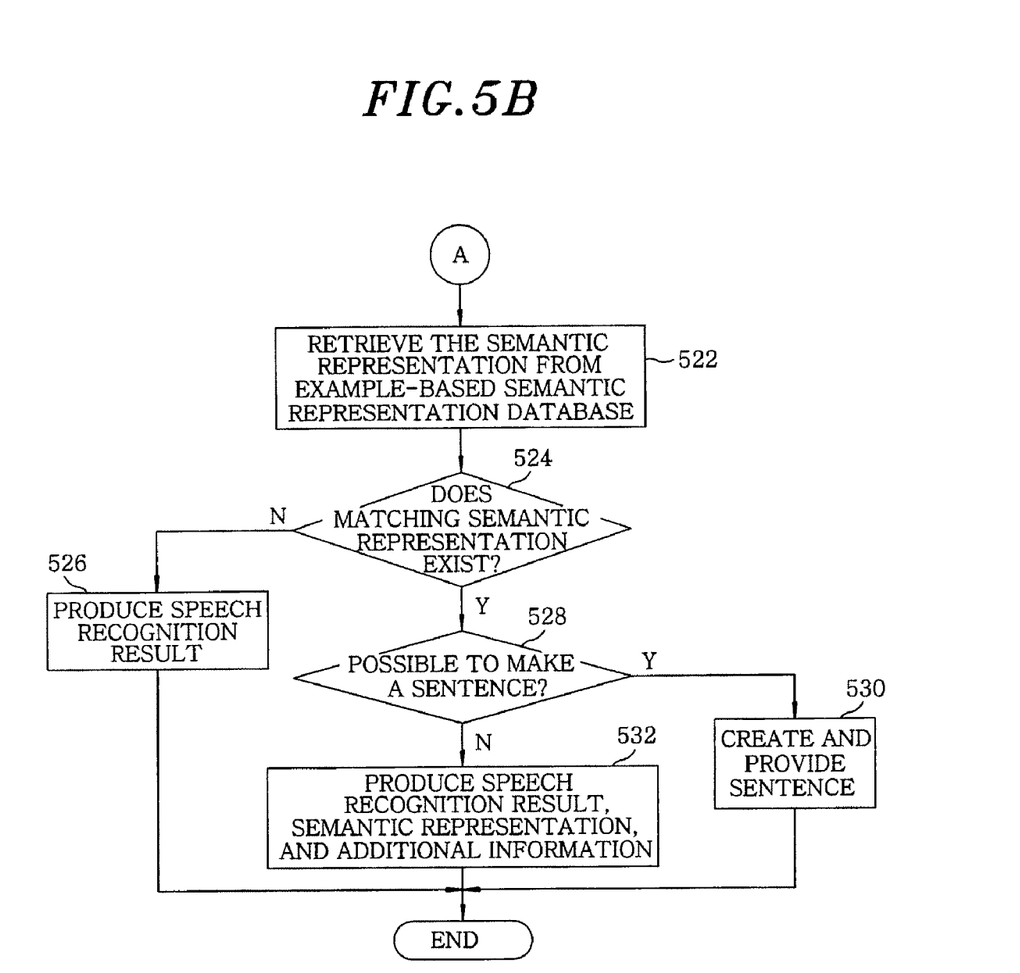

FIGS. 5A and 5B are a flowchart showing a process for determining a semantic representation of an input speech and then selectively producing the same with reference to example-based semantic representation patterns in accordance with the embodiment of the present invention.

Referring to FIGS. 5A and 5B, in the standby mode of the speech understanding apparatus 200 in step 502, the speech recognition unit 202 checks whether a speech of a user is input in step 504.

When a speech is input, the speech recognition unit 202 pre-processes the input speech to extract features for speech recognition from the input speech, and compares the extracted features with an acoustic model of words and a language model representing a connection probability between words to selectively produce a sentence having the highest probability in step 506. The produced sentence, as a speech recognition result, is provided to the second sentence analysis unit 204, and may be in form of a word string (1-best), 'n' number of word strings (n-best), or a lattice of words.

The second sentence analysis unit 204 performs morpheme analysis on the sentence provided as a speech recognition result in step 508, and in step 510, recognizes and extracts additional information on the sentence. In detail, the second sentence analysis unit 204 recognizes and extracts the tense of declinable words based on the morpheme analysis result, an aspect such as a progressive aspect, a modality such as an imperative modality, and a sentence pattern such as an affirmative sentence, a negative sentence, and an interrogative sentence. Such an additional information is stored in the additional information database 206. For example, when it is assumed that the speech recognition result from the speech recognition unit 202 is a simple sentence saying "김포 공항에서 가까운 호텔은 어느 곳입니까 (Where is the hotel close to GimPo Airport)", it can be seen that '가까운' and '입니까(이다)' indicate the 'present' tense. Also, it can be seen that, as another examples, a sentence '밥을 먹고 있습니다 (I'm eating a food)' indicates a 'progressive' aspect for '먹다 (eat)', and a sentence '고기를 더 익혀주세요 (Please, get the meat well done)' indicates an 'imperative' modality for '익히다 (get)'.

Further, the second sentence analysis unit 204 performs syntax analysis on the sentence using the morpheme analysis result and the additional information in step 512. Here, the morpheme analysis result may include morphemic tags or symbols. In the case of syntax analysis, dependencies can be indicated by text-indent or the like, for example, depending on the dependency grammar or the like.

Next, the second hierarchy describing unit 208 describes hierarchy of the sentence, for example, by bracketing based on the syntax analysis result, and the second class transformation unit 210 performs class transformation on the sentence, whose hierarchy has been described, with reference to the thesaurus/ontology database 212 and the classification rule dictionary database 214 in step 514. By this class transformation, for instance, a noun is converted into a hypernym class, synonyms from declinable words are converted into a single word, particles subject to phonological change due to a final consonant are assigned to the same class, and numeric representations of time and amount are classified by using automata so as to recognize various numerical variations.

The semantic representation determination unit 216 marks optional expressions (e.g., expressions that may appear or not) for the sentence that has been undergone class transformation in step S516. Subsequently, in step 518, the semantic representation determination unit 216 deletes meaningless expressions such as interjections (exclamations), and deletes additional information including aspect, modality, tense, sentence pattern, and the like from declinable words in the sentence to convert the sentence into its base form. And the semantic representation determination unit 216 also deletes morphemic tags or symbols of the sentence. Through the above process, a final semantic representation is produced in step 520. The semantic representation from the abovementioned sentence saying "김포 공항에서 가까운 호텔은 어느 곳입니까 (Where is the hotel close to GimPo Airport)" can be produced as shown in Table 7.

TABLE 7

((((($공항+[에서]) $가까운)$호텔+[$auxiliary particle -은/는]) (어느 곳)+이다)*가까운 - present *이다 - present * interrogative sentence The speech recognition result, the semantic representation, and the additional information are delivered to the semantic representation retrieval unit 220.

The semantic representation retrieval unit 220 retrieves the delivered semantic representation (i.e., determined semantic representation) from the example-based semantic representation pattern database 118 in step 522.

If the semantic representation does not exist in the example-based semantic representation pattern database 118 in step 524, the retrieval result processing unit 222 produces the delivered speech recognition result in step 526.

Meanwhile, if the semantic representation exists in the example-based semantic representation pattern database 118 in step 524, the retrieval result processing unit 222 checks whether or not the retrieved semantic representation is set to be made into a sentence in step 528.

As a result of checking in step 528, if the retrieved semantic representation can be made into a sentence, the retrieval result processing unit 222, in step 530, converts the retrieved semantic representation into a sentence (i.e., a sentence corresponding to the retrieved semantic representation) with reference to the example-based semantic representation pattern database 118 and then produces the converted sentence.

Meanwhile, as a result of checking in step 528, the retrieved semantic representation cannot be made into a sentence, the retrieval result processing unit 222 produces the delivered speech recognition result, the semantic representation, and the additional information in step 532.

Through the above procedures, it is possible to retrieve a semantic representation corresponding to an input speech based on examples and effectively produce a semantic representation reflecting the user's intention.

Meanwhile, in case of an automatic interpretation system using the pattern database building apparatus 100 and the speech understanding system 200 as described above, translation accuracy can be improved by adding translated semantic representation patterns to example-based semantic representation patterns. Also, in case of a speech interactive system, the robustness of speech recognition can be improved by establishing the system to process all utterances that may be created from example-based semantic representation patterns.

In accordance with the present invention, an optimum semantic representation reflecting the user's intention for an input speech is determined by producing a semantic representation corresponding to the input speech, rather than by producing a speech recognition result as it is after being applied to a speech recognition application system, and then errors are corrected, to thereby produce a semantic representation result that fits the applied system. As a result, the system performance may be improved.

Further, in accordance with the present invention, if a retrieved semantic representation has a relatively low degree of matching, a speech recognition result is produced as it is, thereby preventing degradation of system performance in advance.

While the invention has been shown and described with respect to the embodiments, it will be understood by those skilled in the art that various changes and modification may be made without departing from the scope of the invention as defined in the following claims.

What is claimed is:

1. A pattern database building apparatus, comprising:
   a sentence analysis unit for segmenting an input corpus into example sentences with reference to a phrase dictionary and performing morpheme analysis and syntax analysis on the segmented example sentences;
   a hierarchy describing unit for describing hierarchy of the example sentences based on results of the morpheme analysis and the syntax analysis;
   a class transformation unit for performing class transformation on the example sentences, whose hierarchy has been described, with reference to a thesaurus/ontology and a classification rule dictionary; and
   a semantic representation pattern determination unit for marking optional expressions for the example sentences that have undergone the class transformation, deleting meaningless expressions and additional information, converting the example sentences into their base form, deleting morphemic tags or symbols to determine a semantic representation pattern of the example sentences, and storing the determined semantic representation pattern in a database.

2. The pattern database building apparatus of claim 1, wherein the sentence analysis unit assigns the morphemic tags or symbols to the example sentences through the morpheme analysis, and indicates dependencies of the example sentences by text-indent based on a dependency grammar through the syntax analysis.

3. The pattern database building apparatus of claim 1, wherein the hierarchy of each of the example sentences is described by bracketing.

4. The pattern database building apparatus of claim 1, wherein the class transformation unit converts a noun into a hypernym class, converts synonyms from declinable words into a single word, assigns particles subject to phonological change due to a final consonant to the same class, and classifies numeric representations of time and amount by using automata.

5. The pattern database building apparatus of claim 1, wherein the additional information includes at least one of aspect, modality, tense, and sentence pattern.

6. A speech understanding apparatus, comprising:
   a speech recognition unit for recognizing an input speech to produce a speech recognition result;
   a sentence analysis unit for performing morpheme analysis on a sentence corresponding to the speech recognition result, recognizing and extracting additional information, and performing syntax analysis;
   a hierarchy describing unit for describing hierarchy of the sentence based on the additional information and results of the morpheme analysis and the syntax analysis;
   a class transformation unit for performing class transformation on the sentence, whose hierarchy has been described, with reference to a thesaurus/ontology and a classification rule dictionary;
   a semantic representation determination unit for marking optional expressions for the sentence that has undergone the class transformation, deleting meaningless expressions and the additional information, converting the sentence into its base form, and deleting morphemic tags or symbols to determine a semantic representation;
   a semantic representation retrieval unit for retrieving the determined semantic representation from an example-based semantic representation pattern database; and
   a retrieval result processing unit for selectively producing a retrieved semantic representation depending on whether or not the determined semantic representation exists in the example-based semantic representation pattern database.

7. The speech understanding apparatus of claim 6, wherein the sentence analysis unit assigns the morphemic tags or symbols to the sentence through the morpheme analysis, and indicates dependencies of the sentence by text-indent based on a dependency grammar through the syntax analysis.

8. The speech understanding apparatus of claim 6, wherein the hierarchy describing unit describes the hierarchy of the sentence by bracketing.

9. The speech understanding apparatus of claim 6, wherein the class transformation unit converts a noun into a hypernym class, converts synonyms from declinable words into a single word, assigns particles subject to phonological change due to a final consonant to the same class, and classifies numeric representations of time and amount by using automata.

10. The speech understanding apparatus of claim 6, wherein the retrieval result processing unit produces the speech recognition result if the determined semantic representation does not exist in the example-based semantic representation pattern database.

11. The speech understanding apparatus of claim 10, wherein the retrieval result processing unit creates a sentence corresponding to the retrieved semantic representation, or produces the speech recognition result, the retrieved semantic representation and the additional information, if the determined semantic representation exists in the example-based semantic representation pattern database.

12. A speech understanding method comprising:
   recognizing an input speech to produce a speech recognition result;
   performing morpheme analysis on a sentence corresponding to the speech recognition result, recognizing and extracting additional information, and performing syntax analysis;
   describing the hierarchy of the sentence based on the additional information and results of the morpheme analysis and the syntax analysis;
   performing class transformation on the sentence whose hierarchy has been described;
   marking, by a computer, optional expressions for the sentence that has undergone the class transformation, deleting meaningless expressions and the additional information, converting the sentence into its base form, deleting morphemic tags or symbols to determine a semantic representation;

retrieving the determined semantic representation from an example-based semantic representation pattern database; and selectively producing a retrieved semantic representation depending on whether or not the determined semantic representation exists in the example-based semantic representation pattern database.

13. The speech understanding method of claim 12, wherein the morpheme analysis is performed by assigning the morphemic tags or symbols to the sentence, and the syntax analysis is performed by indicating dependencies of the sentences by text-indent based on a dependency grammar.

14. The speech understanding method of claim 12, wherein the hierarchy of the sentence is described by bracketing.

15. The speech understanding method of claim 12, wherein said performing class transformation includes:

converting a noun into a hypernym class;

converting synonyms from declinable words into a single word;

assigning particles subject to phonological change due to a final consonant to the same class; and classifying numeric representations of time and amount by using automata.

16. The speech understanding method of claim 12, wherein said selectively producing the retrieved semantic representation produces the speech recognition result if the determined semantic representation does not exist in the example-based semantic representation pattern database.

17. The speech understanding method of claim 16, wherein said selectively producing the retrieved semantic representation creates a sentence corresponding to the retrieved semantic representation, or produces the speech recognition result, the retrieved semantic representation and the additional information, if the determined semantic representation exists in the example-based semantic representation pattern database.

* * * * *